Patented Aug. 6, 1940

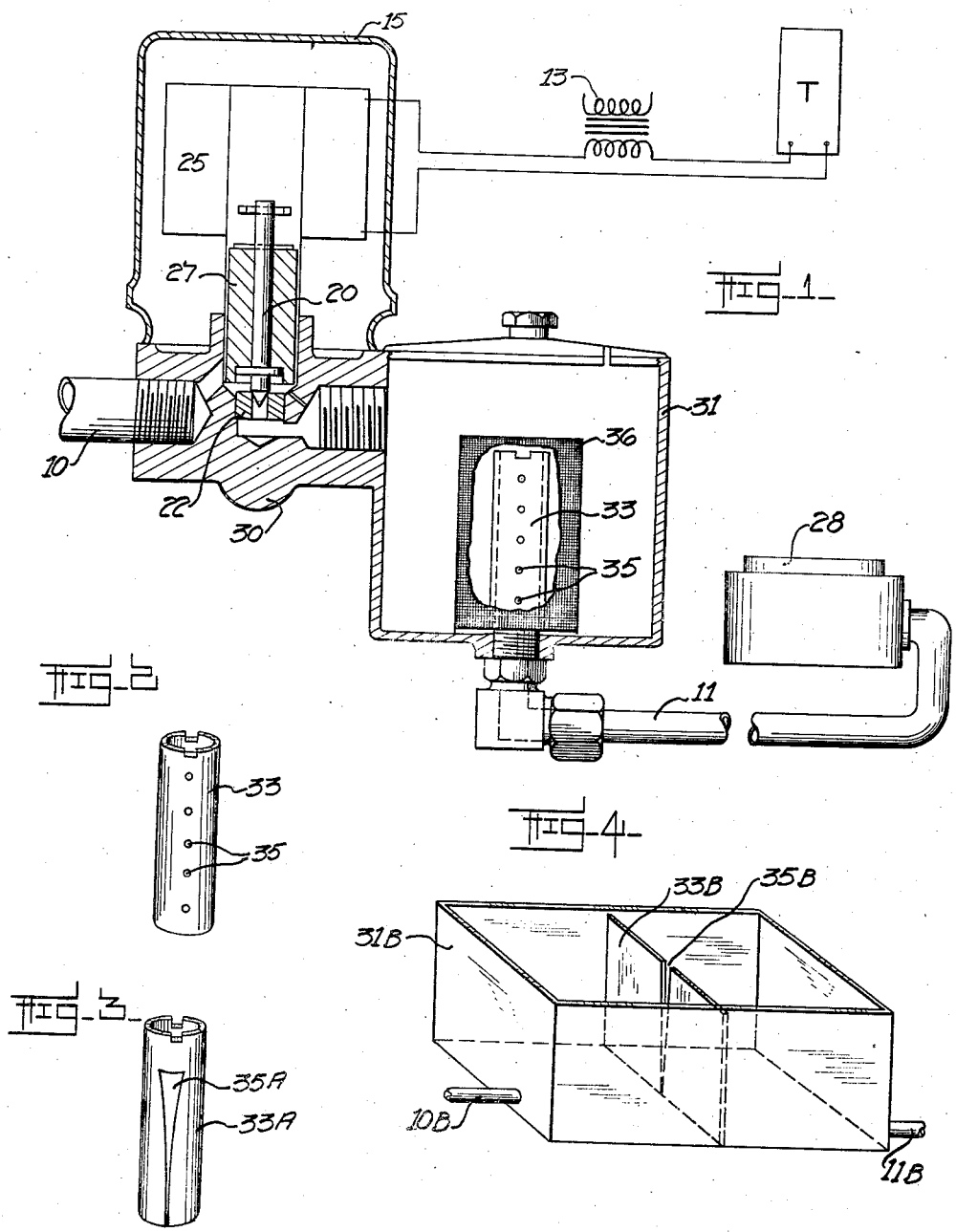

2,210,118

UNITED STATES PATENT OFFICE 2,210,118

LIQUID FLOW CONTROLLING DEVICE

James A. S. Duncan, Detroit, Mich.

Application December 15, 1937, Serial No. 179,941

1 Claim. (Cl. 158—36)

This invention relates to flow controlling devices for liquids, and particularly to improved apparatus for preventing unwanted surges in liquid fuel supply lines and other conduits.

In feeding fuel oil to burners of the so-called "high-low" type, the supply must be alternately started and cut off. When, after an off interval, the flow is turned on (by an automatic valve or the like) and combustion is started, undesirable results frequently occur, as the sudden full supply of fuel somewhat floods the burner, causing the latter to ignite with an objectionable puff and resulting in incomplete combustion and its accompanying soot and smoke.

An important object of this invention is to provide a flow controlling device which, when used with a valve, prevents such surges of fuel, causing the flow to start and stop gradually, and preventing noise, soot and incomplete combustion.

Another object is to provide such a device which incorporates no moving parts and which, when the liquid is flowing normally, offers no restriction to such flow of liquid.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a substantially central cross sectional view of an assembly comprising an automatic valve and a regulating device constructed in accordance with this invention, diagrammatically showing the controlling means for the valve, and the burner which the valve in turn controls.

Figure 2 is a perspective view of the controlling gate element removed from the assembly.

Figure 3 is a view similar to Figure 2 of a somewhat modified gate element, and

Figure 4 is a perspective view of a modified flow controlling device.

Referring now to the drawing, and particularly to Figure 1, 10 designates a conduit such as is used for supplying fuel oil to an oil burner, as 28. Conduit 10 leads to the controlling assembly, while a continuation 11 leads from the controlling assembly to the burner. The fuel flow is adapted to be started and stopped by the electromagnetically operated valve, which is controlled by a thermostat T and supplied with current from a transformer or other suitable source as 13. The casing of the valve is designated 15. The valve member 20 normally rests upon valve seat 22 to close the valve, but is adapted to be lifted by a solenoid 25 whose slidable core 27 surrounds the valve in such manner as to raise the valve when the solenoid is energized and to allow it to fall when it is deenergized. The core is slidable on the valve the lost motion thus provided imparting an impact action and promoting quick opening and closing and firm seating.

To the valve body 30 is attached a chambered metering casing 31, within which is arranged a metering gate 33 connected to the outlet and upstanding within the casing 31 in such fashion as to partially block the outflow of oil whenever the level within the chamber is below a predetermined point. The gate is tubular in form and open at its top, and may be so designed that full flow is only possible when the oil overflows its top. A series of orifices as 35 extend through the wall of the gate element. Through these orifices, as the oil level rises in casing 31, oil may flow to the outlet at a controlled and increasing rate. A protecting screen as 36 may surround the gate if desired.

By virtue of this construction, when valve 20 is opened, assuming the gate chamber 31 to be empty, the full flow of oil released by the valve cannot surge at once to the burner feed pipe 11. The level must first rise in the gate chamber. The rising oil escapes to the outlet through more and more of the orifices 35 as the level rises. The total area of all of the orifices may equal or exceed the maximum flow, so that the oil need not overflow the gate member, although this is a matter of choice, and it will readily be seen that if desired the full flow may be permitted only when the gate is overflowed. Only a gradual increase in flow is thus permitted, and flooding of the burner is effectively prevented. The rate of increase is of course controlled by the diameters of the apertures.

As shown in Figure 3, a single metering orifice as 35A may be formed in the gate, and a V shape may be employed to allow a controlled increase of rate of flow faster than would otherwise occur as the level rises.

Another somewhat modified controlling device, shown in Figure 4 comprises a simple box-like casing 31B divided by a partition 33B. The two chambers formed by the partition are connected to supply and delivery pipes as 10B—11B, respectively. An aperture 35B in the partition, whose width increases in graduated V form from bottom to top, controls the rate of flow to the outlet, and it will be apparent that after the flow has been decreased or stopped, a sudden increase in the rate of delivery of the liquid cannot correspondingly increase the rate of delivery and cause surges of fluid to be transmitted to the burner or other destination.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

What I claim is:

In combination with a burner and a liquid fuel supply pipe therefor, an automatic valve movable to and from a fully opened position, to open and close said pipe, automatic flow graduating means incorporated in said pipe between the valve and the burner to reduce the fuel flow below normal and prevent surge when the valve is suddenly opened after a closed interval, said means allowing a full flow of fuel during normal operation, including a chambered casing into which the fuel from the valve is delivered, said casing having outlet portions of graduated proportions, to increase the total area of said portions from bottom to top, whereby said outlet portions allow only a restricted flow therethrough when the level in said chamber is low, and permit a graduated increase in such flow as the level in the chamber rises.

JAMES A. S. DUNCAN.